United States Patent

[11] 3,547,290

| [72] | Inventors | Harold A. Fratzke;<br>Glenn D. Gniffke, Cottonwood, 56229;<br>Samuel H. Van Selus, Echo, Minn. 56237 |
|---|---|---|
| [21] | Appl. No. | 768,411 |
| [22] | Filed | Oct. 17, 1968 |
| [45] | Patented | Dec. 15, 1970 |

[54] TOWING DEVICE FOR VEHICLES
11 Claims, 6 Drawing Figs.
[52] U.S. Cl. .................................................. 214/506,
214/86: 280/478
[51] Int. Cl. ............................................................ B60p 3/12
[50] Field of Search............................................. 214/505,
506, 86A; 280/414, 478, 482, 492

[56] References Cited
UNITED STATES PATENTS

| 2,661,108 | 12/1953 | Horn et al. .................... | 214/506 |
| 2,856,087 | 10/1958 | Steber ........................... | 214/505X |
| 3,058,608 | 10/1962 | Lewis ............................ | 214/505 |
| 3,417,890 | 12/1968 | Yamazaki...................... | 214/506 |
| 3,458,074 | 7/1969 | Railey ........................... | 214/505 |

Primary Examiner—Albert J. Makay
Attorney—Merchant and Gould

ABSTRACT: A towing device for vehicles, which includes a two-wheeled carriage adapted for connection behind a power-operated towing vehicle, which has a tiltable bed for loading the front end portion of vehicles onto the towing device, in which the bed is rotatable to permit easy turning when towing a vehicle with said device, and which includes a telescoping tongue on the frame of the device equipped with a cable arrangement for pulling vehicles onto the bed.

PATENTED DEC 15 1970

INVENTORS
HAROLD A. FRATZKE
GLENN D. GNIFFKE
SAMUEL H. VAN SELUS
BY
Merchant & Gould
ATTORNEYS PATENTED DEC 15 1970
3,547,290
SHEET 2 OF 2
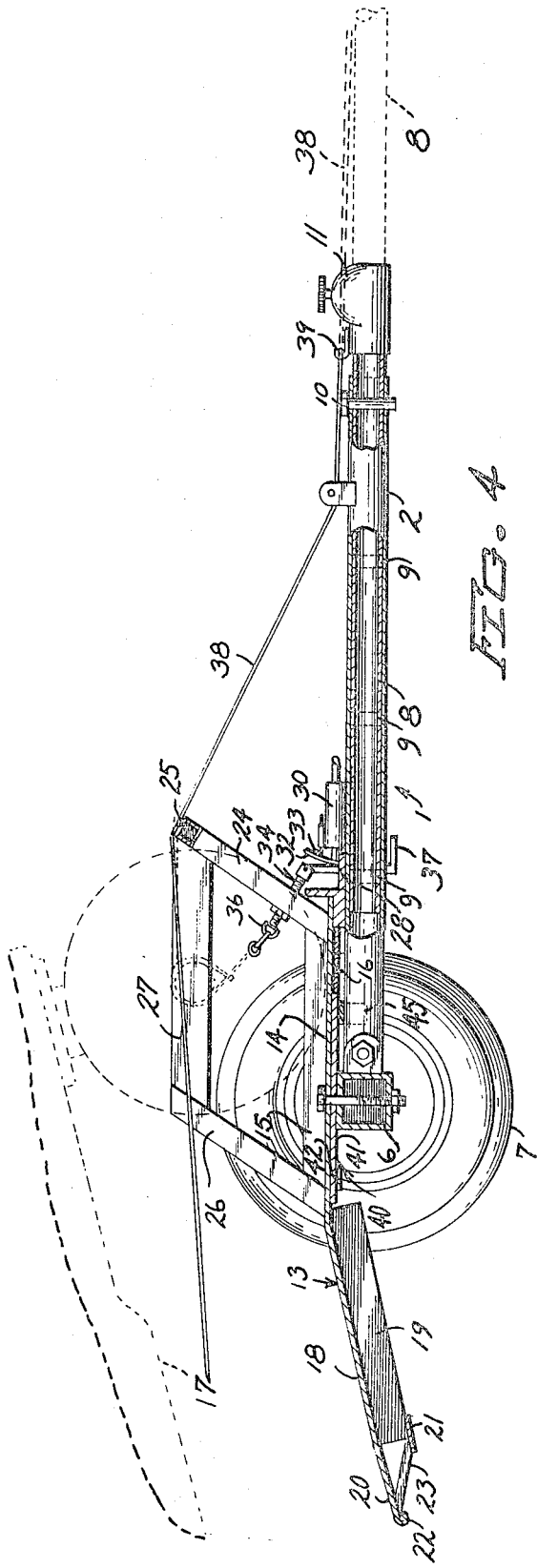
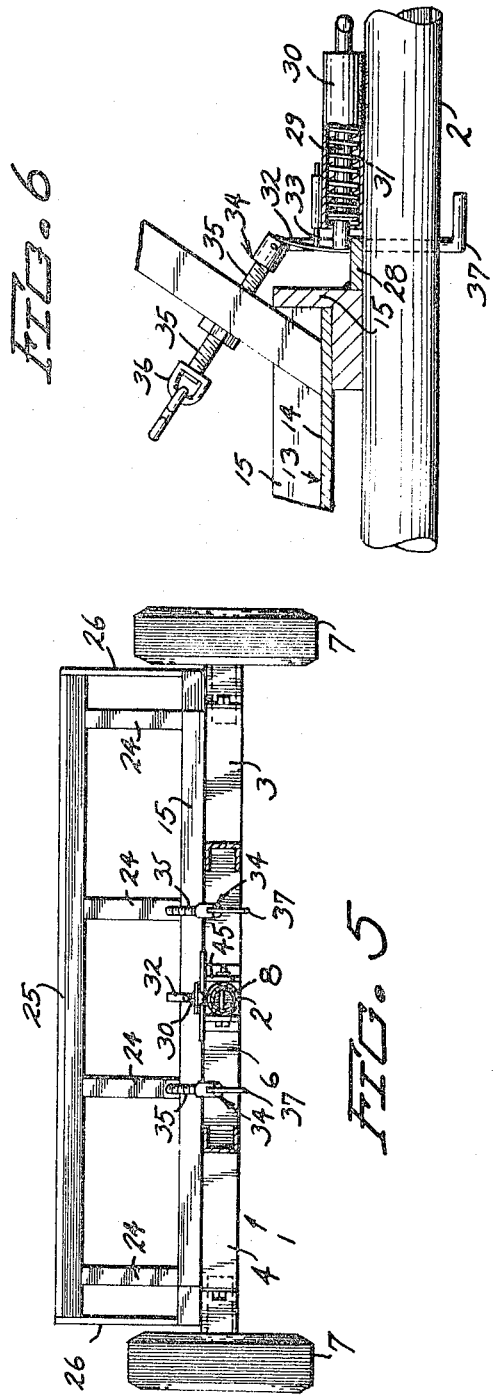
INVENTORS
HAROLD A. FRATZKE
GLENN D. GNIFFKE
SAMUEL H. VAN SELUS
BY
Merchant & Gould
ATTORNEYS 3,547,290

TOWING DEVICE FOR VEHICLES

BACKGROUND OF THE INVENTION

The present invention relates to towing vehicles, and more particularly to a two-wheeled trailing type vehicle adapted for connection to a power vehicle and having a tilting bed for the loading of other vehicles thereon to be towed. Large vehicles, such as farm tractors, and other like implements are geared for high-power output and as such are not adaptable to over-the-road travel. Also, such devices are difficult to tow and/or load when they must be transported for repair or other reasons. Such vehicles may be loaded on large trailers or truck beds for towing or transport, but the loading of large vehicles in this manner is difficult and time consuming. In addition, large trailers and similar devices are expensive and often not needed by many farmers and equipment dealers who periodically need to tow tractors and other large vehicles. There is a need for a relatively small and economical towing device which may be connected as a trailer to a power-operated vehicle, and which is designed to permit easy loading and unloading of a vehicle thereon.

SUMMARY OF THE INVENTION

The applicants' invention provides an improved towing device which provides easy loading and unloading of a vehicle thereon and which may be economically produced at a cost which will make the device marketable for a large number of farmers and equipment dealers. This invention is designed with a tilting bed which is movable between an inclined position and a generally horizontal position and which also includes an extensible and retractable tongue provided with a cable arrangement to permit easy loading and unloading of a vehicle on the bed of the device. With this arrangement it is particularly easy to move the front or rear end portions of a farm tractor or other vehicle onto the tiltable bed of the towing device for transport.

The bed of the towing device is rotatably connected to the axle for rotary movements about a vertical axis to permit easy turning while towing a vehicle. Further, the present invention provides a unit which may be quickly and easily operated by a single person and which provides efficient means for towing and transporting vehicles with a minimum of effort and expense.

Other advantages of the present invention will become apparent upon review of the following description and drawings.

DESCRIPTION OF THE DRAWINGS

Referring to the drawings, which illustrate the preferred embodiment of the present invention, and in which like characters indicate like parts throughout the several views:

FIG. 4 is a view in vertical section taken generally along the line 4—4 of FIG. 1;

FIG. 5 is a view in vertical section taken generally along the line 5—5 of FIG. 1; and FIG. 6 is an enlarged detailed view in section taken generally along the line 6—6 of FIG. 1, some portions thereof being broken away.

DESCRIPTION OF THE PREFERRED EMBODIMENT

Figure 1:
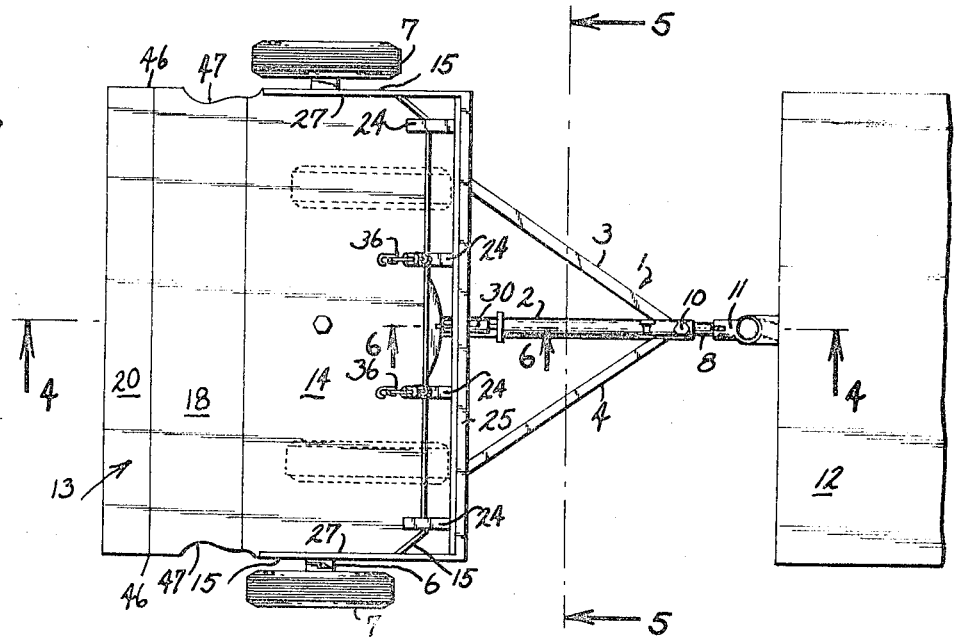
FIG. 1 is a view in top plan showing the towing device of the present invention hitched to a power-operated vehicle, such as a truck.

Referring more particularly to the drawings, the towing device of the present invention includes a rigid frame, represented generally by the reference numeral 1. The frame 1 includes a forwardly directed tongue member 2 and diagonal brace members 3, 4. The rear portions of the tongue member 2 and the brace members 3, 4 are pivotally secured, as at 5, to a transverse axle 6, as shown particularly in FIG. 3. The axle 6 is formed with a rectangular cross section, as shown in FIG. 4, and has a pair of wheels 7 mounted in the usual manner at the opposite end portions of the axle 6. As is shown in particularly FIGS. 3 and 4, the members 2—4 of the frame 1 are pivotally secured to the axle 6 along a common axis disposed slightly forwardly of the axle 6.

The tongue member 2 of the frame 1 is tubular in cross section and is provided with a telescoping, extensible and retractable inner tongue member 8. The tongue members 2, 8 are each tubular in construction and circular in cross section as shown in FIG. 5, and several longitudinally spaced holes 9 are provided in member 8 as shown particularly in FIG. 4, for selective alignment with a hole in member 2 to permit positioning of the inner tongue member 8 in various longitudinal positions. A pin 10 is provided for securing the tongue members 2, 8 in the desired position. The forward end portion of the inner tongue member 8 is provided with a common hitch 11 for easily removably securing the same to a towing vehicle, such as for example the truck 12 fragmentarily shown for purposes of illustration in FIGS. 1 and 2.

The towing device of the present invention further comprises a generally rectangular, flat bed, represented in its entirety by the number 13 and disposed generally above the axle 6, as shown by FIG. 4. The bed 13 includes a generally flat floor plate 14 formed of a rigid sheet of material, such as steel plate, with a rigid edge member 15 around the forward side and opposite end sides thereof. The edge member 15 may be suitably formed by angle iron welded or otherwise rigidly secured around the floor plate 14, as shown in FIG. 4. The bed 13 also includes a pair of bracing joists 16 secured to the bottom of the floor plate 14 on opposite sides of the center portion of the bed 13 which act as rub rails as will become apparent hereinafter.

The bed 13 and the axle 6 are mounted for common pivotal movements with respect to the frame 1 about the generally transverse horizontal axis formed by the pivotal connection 5 of the axle 6 to the frame 1. This permits movement of the bed 13 between its generally horizontal position or vehicle transporting position, shown by full lines in FIG. 2, and an inclined or loading position, shown by dotted lines in FIG. 2, for loading or unloading a vehicle, such as the farm tractor 17, onto the bed 13.

Figure 2:
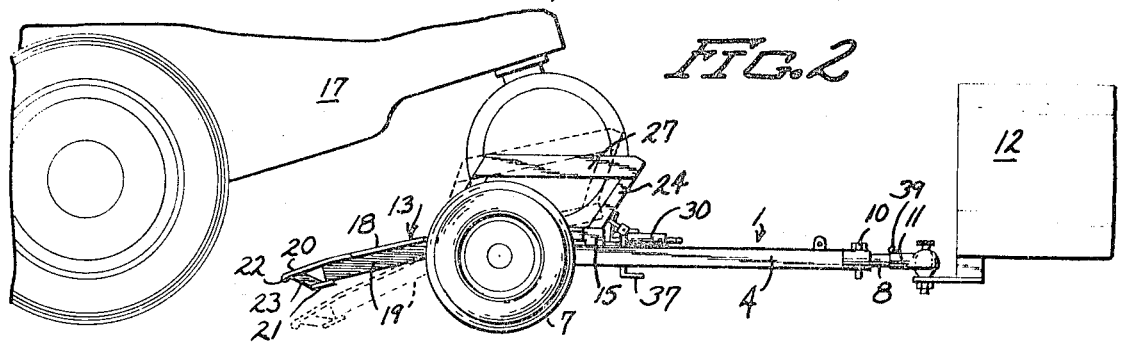
FIG. 2 is a view in side elevation showing a farm tractor positioned on the towing device and with the bed of the towing device shown in an inclined position by dotted lines.

To permit easy loading and unloading of a vehicle onto the bed 13, the bed 13 is provided with a rearwardly and downwardly extending or sloping rear bed portion 18 which provides a ramp when the bed is tilted or moved to its dotted line position shown in FIG. 2. The rear bed portion 18 includes a pair of laterally spaced joist members 19 secured to a floor plate extension 20. The rear bed portion further includes a base plate 21 secured between the joist members 19 to form a supporting pad to distribute the weight when a vehicle is moved onto the bed 13. Also, as shown particularly in FIG. 2, the rear edge 22 of the bed portion 18 is formed with a circular bar welded or otherwise secured to the plate extension 20, and a pair of angle braces 23 extend from the rear edge 22 to the base plate 21 for providing additional structural support.

For the purpose of defining sides for the vehicle supporting bed 13, a forwardly and upwardly extending front rail portion is provided by means of front rail struts 24 and upper front rail member 25. Further, end rail portions are provided at the opposite ends of the bed 13 by means of upwardly and forwardly extending end rail struts 26 and upper end rail members 27. With this arrangement, the railing structure provides a means for keeping a vehicle placed upon the bed 13 from accidental movement off from bed 13 prior to securement or anchoring of the vehicle by means described hereinafter.

As shown in detail in FIG. 6, a latch mechanism is provided for releasably securing the bed 13 in its horizontal position shown by full lines in FIG. 2. The latch mechanism includes an arcuate latch plate 28 rigidly secured to the lower front portion of edge member 15, as well as a latch bolt 29, shown in FIG. 6. The latch bolt 29 is carried by a tubular housing 30 equipped with a coil spring 31 for biasing the latch bolt 29 toward engagement above the arcuate latch plate 28, as shown particularly in FIG. 6. The inner end portion of the latch bolt 29 is provided with an arcuate and upwardly and outwardly extending strike bar 32 secured to the end of the latch bolt 29 and guided by a rod 33 slidingly mounted on top of the latch housing 30. With this mechanism, it will be obvious that the downward movement of the bed 13 will displace the latch bolt 29 against the bias of a coil spring 31 and permit return movement of the latch bolt to secure the bed in its horizontal position shown particularly in FIG. 6.

The bed 13 is further provided with a pair of anchoring rods 34 carried by the center rail struts 24 which extend upwardly and forwardly at the front portion of the bed 13. Each of the anchoring rods 34 comprises a screw-threaded portion 35 threadably received in its corresponding strut 24 and provided at its rearward end with a clevice mounted hook 36. As shown particularly in FIGS. 5 and 6, the forward end of each of the anchoring rods 34 is provided with a pivotally mounted crank handle 37 to permit rotary adjustment of the anchors toward and away from a vehicle 17, such as shown in FIG. 4, carried by the bed 13. Various types of vehicles may be conveniently anchored and secured to the bed 13 by use of cables or chains secured to the loaded vehicle and also secured to the hooks 36 of the anchoring rods 34, as illustrated by dotted lines in FIG. 4.

In order to permit convenient loading of a vehicle onto the bed 13 of the towing device described herein, a cable 38, or its equivalent (such as a chain), is connected at its forward end to a hook 39 on the extensible inner tongue member 8, as shown in FIG. 4. The other end of the cable 38 is secured onto the front end of a vehicle or other unit to be loaded on the bed 13, and the inner tongue member 8 is pulled forward by a towing vehicle, such as the truck 12 shown in FIGS. 1 and 2.

The present invention provides a simple arrangement for loading of a bulky and heavy vehicle, such as the tractor 17, onto the towing bed 13 by a sole operator. For ease of understanding the loading operation of the present invention, reference is made to FIG. 2 of the drawings. Prior to loading a vehicle, such as the tractor 17, onto the bed 13, the wheels 7 are blocked at their forward sides or otherwise prevented from forward movement. With the inner tongue member 8 in its retracted or rear position shown in FIG. 2, the cable 38 or similar element is secured to the hook 39 of the inner tongue member 8 and also secured to the front portion of the tractor 17 or other vehicle positioned at the rear of the bed 13. The bed 13 is then unlatched by release of the latch bolt 29, and the towing vehicle or truck 12 is moved forwardly to pull the tractor 17 or other vehicle onto the inclined rear portion 18 of the bed 13 and up onto the floor plate 14. Then, prior to towing, the inner tongue member 8 is moved to its retracted position and is secured by the pin 10 and the cable 38 is removed during towing operations. Movement of the front portion of the tractor 17 or other vehicle onto the horizontal portion or the floor plate 14 of the bed 13 will force the bed 13 into its horizontal position shown in full lines in FIG. 2 where it is secured by the engagement of the latch bolt 29 with the arcuate latch plate 28. As noted previously, prior to towing the tractor 17, or other vehicle the same is anchored to the bed 13 by means of the anchoring rods 34, as illustrated in FIG. 4. The tractor 17, or other implement or vehicle, may be quickly unloaded from the bed 13 merely by forward movement of the towing device after the anchoring rods 34 are disconnected.

Figure 3:
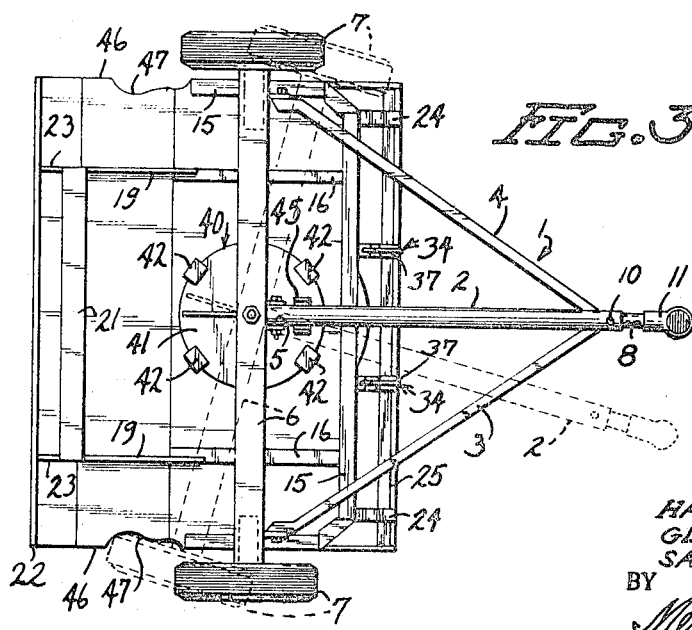
FIG. 3 is a view in bottom plan of the towing device showing an alternate position of some parts thereof by dotted lines.

FIG. 3 illustrates the rotary mounting means 40 of the bed 13 onto the axle 6 to permit turning movements during towing of a vehicle, such as the tractor 17, thereon.

Rotary mounting means 40 includes a circular bearing plate 41 which is positioned between the axle 6 and the bed 13 centrally thereof. A plurality of bracket elements 42 are affixed to the underside of the floor plate 14 at circumferentially spaced points with respect to the circular bearing plate 41. Bracket elements 42 have radially inwardly projecting portions which overlie the peripheral edge of the bearing plate 41 and mount same in face-to-face relationship with the underside of the floor plate 14, so as to permit relative rotary movements of the plate 41 with respect to the floor plate 14. A nut equipped mounting pin 43 is received through aligned openings formed centrally on a vertical axis in the floor plate 14, bearing plate 41 and axle 6. A pair of ears 45 are rigidly affixed to the bottom side of bearing plate 41 and depend therefrom on either side of tongue member 2. Ears 45 restrict rotary movement of the circular bearing plate 41 with respect to the axle 6 and tongue 2 while permitting such rotary movement about the pin 43 between the floor plate 14 and the bearing plate 41.

It will be noted, by reference to FIGS. 3, 4 and 6, that edge member 15 engages the upper surface of frame members 2, 3 and 4, while joists 16 engage the upper surface of the axle 6 and act as rub rails during pivotal movements of the floor plate 14 on the pin 43. Thus, additional lateral ability is provided to the floor plate 14 when a tractor or the like 17 is being supported thereon during towing movements thereof. As shown, particularly in FIGS. 1 and 3, opposite side edges 46 of the floor plate 14 and rear bed portion 18 are relieved as at 46 to permit rotation of the floor plate 14 about the pin 43 without engagement thereof with the wheels 7. With the above description and explanation of the operation of this invention, the important advantages providing ease of operation should be evident.

We claim:
1. A towing device for vehicles comprising:
 a. a rigid frame having a forwardly directed tongue equipped with a hitch for connection to a towing vehicle;
 b. a transverse axle equipped with wheels at the opposite ends of the axle;
 c. a generally flat bed disposed generally above said axle;
 d. means mounting said bed and said axle for common pivotal movements with respect to said frame about a generally transverse horizontal axis and between an inclined position for loading or unloading a vehicle and a generally horizontal position for transporting a vehicle;
 e. means mounting said bed with respect to said axle for rotary movements about a generally vertical axis located generally centrally of said axle to permit relative pivotal movements between said bed and said axle;
 f. said tongue including a longitudinally extensible and retractable forward portion; and
 g. a cable element connectable to said forward tongue portion and to a vehicle rearwardly of said towing device for imparting loading movements to said vehicle onto said bed upon extension of said forward tongue portion.

2. The structure defined in claim 1, in which said bed is formed to define cutout portions on its opposite sides to permit rotary movements of said bed without interference with the wheels on said axle.

3. The structure defined in claim 2, in which said means mounting said bed and axle for common pivotal movements further comprises pivotal connections between said axle and said frame at the opposite end portions of said axle and which connections are disposed forwardly of said axle.

4. The structure defined in claim 3, in which said means mounting said bed for rotary movements about a generally vertical axis comprises a turntable plate secured on said axle and in which said bed is mounted and guided on said plate for rotary movements with respect thereto.

5. The structure defined in claim 4, in which said bed further comprises a generally rectangular floor portion, a forwardly and upwardly extending front rail portion, opposite end rail portions, and a downwardly and rearwardly sloping rear bed portion positioned to form a ramp for loading and unloading vehicles upon movement of said bed to its said inclined position.

6. The structure defined in claim 5, in which said device further comprises an anchoring member carried by said front rail portion of said bed and which is adjustable and adapted for connection to a vehicle on said bed for holding same thereon while towing.

7. The structure defined in claim 6, in further combination with latch means for releasably securing said bed in its said horizontal position.

8. A towing device for vehicles comprising:
   a. a rigid frame having a forwardly directed tongue equipped with a hitch for connection to a towing vehicle;
   b. a transverse axle equipped with wheels at the opposite ends of the axle;
   c. a generally flat bed disposed generally above said axle;
   d. means mounting said bed and said axle for common pivotal movements with respect to said frame about a generally transverse horizontal axis and between an inclined position for loading or unloading a vehicle and generally horizontal position for transporting a vehicle;
   e. means mounting said bed with respect to said axle for rotary movements about a generally vertical axis located generally centrally of said axle to permit relative pivotal movements between said bed and said axle; and
   f. releasable latch means locking said bed in said generally horizontal position while permitting said rotary movements about a generally vertical axis during operative towing movements of said towing device.

9. The structure defined in claim 8, in which said means mounting said bed and axle for common pivotal movements with respect to said frame includes pivotal connections disposed forwardly of said axle.

10. The structure defined in claim 9, in which said pivotal connections are disposed centrally and at opposite ends of said axle.

11. The structure defined in claim 8, in which said releasable latch means includes:
   a. a latch plate rigidly secured on one of said bed and frame means;
   b. a latch dog mounted on the other of said bed and frame means for movement toward and away from locking engagement with said latch plate and cooperating with said latch plate to maintain said bed in a horizontal position during operative towing movements of said towing device while still permitting rotation thereof on said vertical axis;
   c. said latch plate defining an arcuate edge adjacent said latch bolt to permit constant engagement of said latch dog and latch plate during rotation of said bed relative to said frame means; and
   d. means biasing said latch bolt into said locking engagement with said latch plate.